United States Patent [19]

Nash

[11] 4,302,576
[45] Nov. 24, 1981

[54] LACTONE COPOLYMERS AS STRIPPING AIDS IN RECOVERY OF POLYMER FROM SOLUTION

[75] Inventor: Larry L. Nash, Borger, Tex.

[73] Assignee: Phillips Petroleum Company, Bartlesville, Okla.

[21] Appl. No.: 199,764

[22] Filed: Oct. 23, 1980

[51] Int. Cl.$^3$ .............................................. C08F 6/10
[52] U.S. Cl. ................... 528/500; 525/186; 528/486; 528/491
[58] Field of Search ................................ 528/491, 500

[56] References Cited

U.S. PATENT DOCUMENTS

| | | | |
|---|---|---|---|
| 2,992,976 | 7/1961 | Cottle | 203/3 |
| 3,042,637 | 7/1962 | Crouch | 260/17.5 |
| 3,076,795 | 2/1963 | Hall | 528/500 |
| 3,190,868 | 6/1965 | Mitacek et al. | 159/47 R |
| 3,241,246 | 4/1966 | Pollock | 34/10 |
| 3,250,313 | 5/1966 | Irvin | 159/47 R |
| 3,268,501 | 8/1966 | Crouch et al. | 528/487 |
| 3,337,422 | 8/1967 | Colton | 203/36 |
| 3,585,257 | 6/1971 | Mueller, Jr. et al. | 525/114 |
| 3,590,026 | 6/1971 | Carlson et al. | 145/3.2 |
| 3,639,519 | 2/1972 | Hsieh et al. | 525/153 |
| 3,661,872 | 5/1972 | Short et al. | 526/84 |
| 3,764,639 | 10/1973 | Hsieh et al. | 525/314 |
| 3,821,185 | 6/1974 | Cooper et al. | 528/494 |
| 3,959,243 | 5/1976 | Mattioli | 528/494 |
| 4,197,399 | 4/1980 | Noel | 528/500 |

FOREIGN PATENT DOCUMENTS 1242319  8/1971  United Kingdom .
1243713  8/1971  United Kingdom .

*Primary Examiner*—C. A. Henderson

[57] ABSTRACT

A process for recovering a rubbery polymer from a rubber-in-solvent solution by steam-stripping the solution to produce rubber crumb in aqueous phase using a low molecular weight lactone copolymer as stripping aid.

8 Claims, No Drawings

LACTONE COPOLYMERS AS STRIPPING AIDS IN RECOVERY OF POLYMER FROM SOLUTION

FIELD OF THE INVENTION

The invention relates to the recovery of polymers from solution.

BACKGROUND OF THE INVENTION

In the production of rubbery materials by polymerization of one or more polymerizable monomers in a hydrocarbon solvent with organometal initiators, the product is obtained as a substantially rubber-in-hydrocarbon solvent solution, i.e. cement. Of the various recovery processes, steam stripping has been most widely used on a commercial basis.

It is desired to obtain the polymer in the form of a rubber crumb as a slurry in water. The crumb then can be readily removed by filtration, pressing, and final drying of the rubber.

A variety of agents has been suggested to assist in forming a crumb of proper particle size with minimum tendency to coalesce or for the particles to stick together, or, for that matter, to stick to the apparatus. Various surface active agents have been suggested, generally requiring the employment, in addition, of various inorganic salts. However, better methods, simpler methods, reduced number of additives, are desired. Particularly, is it desired to use stripping aids which would be biodegradable.

BRIEF SUMMARY OF THE INVENTION

I have discovered that steam stripping of rubber-in-hydrocarbon solvent solution can be effected with the aid in the aqueous phase of a low molecular weight copolymer of a lactone with a conjugated diene and/or monovinylarene.

The use of a lactone copolymer as the dispersing agent-stripping aid in the steam stripping of rubbery polymers had distinct advantages over the use of the typical dispersing agent-stripping agent which is a water soluble sodium salt of a maleic anhydride/isobutylene copolymer in admixture with calcium chloride. The otherwise frequently encountered problem of corrosion and chloride stress cracking of downstream equipment is not a problem when a lactone copolymer is used as the dispersing agent-stripping aid.

DETAILED DESCRIPTION OF THE INVENTION

The polymer formed by a polymerization of one or more polymerizable olefinically unsaturated monomers in a hydrocarbon solvent by employing organometal initiators is obtained as a substantially rubber-in-solvent solution or dispersion (cement) of usually about 5 to 15 per cent rubber by weight. Other weight compositions can be obtained depending on the monomer, degree of polymerization of the rubber, the molecular weight, and the like, such as from about 1 to 25 per cent rubber. The higher concentrations tend to present greater difficulties in mixing the cement with water, though they also permit handling more rubber with less solvent.

In a steam stripping rubber recovery operation, the rubber-in-solvent solution typically is brought into the stripper. Water, together with a dispersant or stripping aid, is sprayed into the stripper by spray nozzles. The stripper provides intimate contacting of the water with the rubber-in-solvent solution, and is equipped with phase separation means, water removal means, solvent removal means, and steam supply as well as necessary temperature and other controls.

The stripping aid may be sprayed into the top of the steam stripper, or may be introduced onto a slinging device in the top of the stripper, introduced onto the surface of the crumb slurry, or even injected into the rubber solution line to the stripper. The drawings shown in U.S. Pat. No. 3,190,868 represent a typical stripping operation.

The stripping operation can be in one or in multiple stages, more frequently in two stages, operating the first stage at such as about 200° F., the second stage usually at about 220° F., subject to variation depending on the rubber, sensitivity, solvent volatility, amount of solvent to be removed, and the like. The polymer cement typically is fed into a closed stripper vessel containing water through which steam is bubbled, substantially continuously, at a temperature of such as about 210 plus or minus 30° F. (99 plus or minus 17° C.). The hydrocarbon solvent vaporizes and is removed from the top of the stripping vessel, and the now precipitated polymer (polymer crumb) remains dispersed in the water and is drawn from the bottom of the vessel. The hydrocarbon solvent overhead is recovered and can be recycled as may be desired. The system usually is operated to give a final hydrocarbon solvent content in the rubber crumb generally below about 1 weight percent. The stripped crumb-in-water can be sent to a separator as a convenient to handle slurry, water removed by suction, vacuum, or the like, and the rubber then sent on to be dried, baled, packaged, or used for compounding as may be desired. Processes and equipment are well known in the art and need not be further described.

POLYMERS TO BE STEAM-STRIPPED

Using the process of my invention, it is possible to recover polymer crumb from various types of polymer-in-solution. The polymers usually are the rubbery polymers prepared by polymerizing one or more conjugated diene monomers as described hereinafter. The conjugated dienes can be polymerized alone, or in admixture with or sequentially one or more other compounds containing an active $CH_2=C<$ group which are copolymerizable therewith. Suitable comonomers containing this group include the monovinylarenes as described hereinafter, as well as acrylonitrile, methyl acrylate, methyl methacrylate, vinyl chloride, methyl vinyl ether, ethylene, propylene, 1-butene, 1-propene, 1-octene, and the like. Generally at least 50 weight percent conjugated diene is used in the monomer mixture when copolymers are prepared in order to prepare the preferred rubbery copolymers to which the invention is most applicable since rubbery polymers/copolymers are most susceptible to sticky clumping without effective steam-stripping additives.

The polymers to which the steam stripping process of my invention can be applied also include the hydroxyl, carboxyl, mercapto, and amino-containing derivatives of the conjugated diene polymers described.

The polymer cements are prepared by polymerizing the monomers in an organic solvent selected from paraffins, cycloparaffins, and aromatic hydrocarbons, which is relatively inert, non-deleterious, and liquid under the conditions of the polymerization process. Examples include the lower molecular weight alkanes such as propane, butane, pentane, hexane, heptane, and isooctane; cycloparaffins such as cyclohexane; and methylcyclohexane; and aromatic compounds such as benzene and toluene; and the like.

A variety of initiator systems are suitable for the solution process polymerization production of the polymers.

One useful type of initiator system is a two or more component system wherein one component is an organometal compound of the metals of Groups I, II, and III, including those where one or more but not all of the organo is replaced by a halogen, a metal hydride, or a metal of Group I, II or III, and the second component is a Group IV to VI compound, e.g., salt or alcoholate. This type of initiator system is fully described with examples in columns 5 and 8 of U.S. Pat. No. 2,886,561, dated May 12, 1959.

Another type of suitable initiator system are the organolithium compounds $R^2(Li)_x$ as described hereinafter for preparing the lactone copolymers. The amount of organolithium initiator used to prepare the conjugated dienes polymers can vary over a broad range, but in general is in the range of about 0.1 to 100, preferably about 0.25 to 2, gram milliequivalents of lithium per 100 parts by weight of total monomers charged. Of course, organoalkali metal compounds of other Group Ia metals can be used as is known in the art.

Another initiator system utilizes a cobalt compound and a metal alkyl of the Group III metals as exemplified by aluminum wherein one but not all of the alkyl groups can be replaced by halogen. Examples of these organometal compounds include trialkyl aluminums such as triethylaluminum and triisobutylaluminum, and alkyl aluminum halides such as ethylaluminum dichloride and diethylaluminum chloride. For the cobalt compound, the cobaltous form is preferred, including such as cobaltous chloride, cobaltous sulfate, and cobaltous nitrate, and the salts of organic acids such as cobaltous acetate.

STRIPPING AIDS

Stripping Aid Amount

The amount of lactone copolymer used as a dispersing agent-stripping aid preferably should be at least about 0.1, more preferably greater than about 0.2, part by weight per 100 grams of rubbery polymer recovered. The upper limit normally is restricted only be economics and the amount of low molecular weight lactone copolymer that can be tolerated in the polymer being recovered. A working upper limit usually is about 1 part by weight; though more is normally not objectionable, simply less economical. The low molecular weight lactone copolymer can be added to the polymer cement which is to be steam stripped either as the pure copolymer, or alternatively as a solution in a hydrocarbon solvent containing broadly from about 2 to 70 weight percent lactone copolymer, more conveniently about 5 to 50 weight percent. The low molecular weight lactone copolymer can be added to the polymer cement at any point in the polymerization system prior to the steam stripping zone.

LACTONE COPOLYMERS

The lactone block copolymers suitable for use as dispersing agent-stripping aids in the process of this invention are low molecular weight copolymers of (a) a lactone, with (b) a conjugated diene and/or a monovinylarene. Suitable lactone copolymers are described for example in U.S. Pat. Nos. 3,585,257, 3,639,519, and 3,764,639, the disclosures of which are herein incorporated by reference.

The weight percent polymerized lactone in the block copolymer will range from about 10 to 60 weight percent of the total polymerized monomers. The molecular weight of the lactone copolymers, calculated on the basis of millimoles of initiator per 100 g of total monomer charge, should be broadly from about 2,000 to 100,000, preferably about 10,000 to 50,000.

The lactone block copolymers can be prepared in a multi-step process in which either a conjugated diene, a monovinylarene, or a mixture of conjugated diene and monovinylarene, is polymerized to essentially quantitative conversion using a lithium-containing initiator. Each succeeding step then can involve the addition of a different conjugated diene or monovinylarene, or mixture, so that a block copolymer having two or more blocks is formed before the lactone is added. The addition and polymerization of a lactone, mixture of lactones, or successive increments of different lactones are the final steps prior to termination in the multi-step polymerization process. The lactone block copolymers can be prepared using a recipe in which the lactone or mixture of lactones constitutes about 15 to 90 weight percent of the total monomers, preferably about 25 to 80 weight percent.

The conjugated diene monomer and/or the monovinylarene monomer is polymerized first because the polymer-Li structure, or the polymer-O-Li structure of the capped or coupled conjugated diene block, monovinylarene block, or conjugated diene-monovinylarene block, is believed to serve as the catalyst for the polymerization of the lactone monomer. If the lactone monomer is polymerized first, the lactone polymer-O-Li structure does not provide a reactive site for the subsequent polymerization of the conjugated diene or monovinylarene, and the desired lactone block copolymer does not form.

Conjugated dienes containing such as 4 to 12 carbon atoms per molecule and monovinylarenes containing such as 8 to 12 carbon atoms per molecule can be used for the preparation of the lactone copolymers. Suitable conjugated dienes include 1,3-butadiene, isoprene, piperylene, 1,3-hexadiene, 1,3-octadiene, 6-phenyl-1,3-hexadiene, and mixtures. Suitable monovinylarenes include styrene, α-methylstyrene, 4-methylstyrene, 4-isopropylstyrene, 2,4-dimethylstyrene, 1-vinylnaphthalene, 2-vinylnaphthalene, and mixtures.

Lactone monomers can be represented by the formula

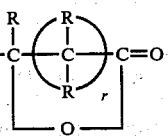

in which each R is selected from hydrogen, alkyl, cycloalkyl, alkenyl, cycloalkenyl and aryl, and combinations thereof such as alkaryl and aralkyl; r' is selected from R, hydrogen, and a radical of the formula

When R' is the specified radical, no R is attached to the carbon atom to which the radical is attached. The total number of carbon atoms in all the R and R' substituents is within the range 0 to 12, and r is 1, 3 or 4.

Examples of lactones include beta-propiolactone, delta-valerolactone, epsilon-caprolactone, and lactones corresponding to the following acids: 2-methyl-3-hydroxypropionic acid, 3-hydroxynonanoic acid, 2-dodecyl-3-hydroxypropionic acid, 2-(1-naphthyl)-3-hydroxypropionic acid, 2-butyl-3-cyclohexyl-3-hydroxypropionic acid, 3-hydroxypentadecanoic acid, 2-(2-methylcyclopentyl)-3-hydroxypropionic acid, 2-o-tolyl-3-hydroxypropionic acid, 3-benzyl-3-hydroxypropionic acid, 2,2-dimethyl-3-hydroxypropionic acid, 2-methyl-5-hydroxyvaleric acid, 3-cyclohexyl-5-hydroxyvaleric acid, 4-phenyl-5-hydroxyvaleric acid, 2-heptyl-4-cyclopentyl-5-hydroxyvaleric acid, 2-methyl-3-phenyl-5-hydroxyvaleric acid, 3-(2-cyclohexylethyl)-5-hydroxyvaleric acid, 2-(2-phenylethyl)-4-propyl-5-hydroxyvaleric acid, 4-benzyl-5-hydroxyvaleric acid, 3-ethyl-5-isopropyl-6-hydroxycaproic acid, 2-cyclopentyl-4-hexyl-6-hydroxycaproic acid, 3-phenyl-6-hydroxycaproic acid, 3-(3,5-diethylcyclohexyl)-5-ethyl-6-hydroxycaproic acid, 4-(3-phenylpropyl)-6-hydroxycaproic acid, 2-benzyl-5-isobutyl-6-hydroxycaproic acid, 2,2,4-trimethyl-3-hydroxy-3-pentenoic acid, 2-phenyl-6-hydroxy-6-octenoic acid, and 2,2-dipropenyl-5-hydroxy-5-heptenoic acid. Mixtures of lactones can be employed.

The initiator used can be any lithium-containing polymerization initiator suitable for conjugated diene and for monovinylarene polymerization. Preferred initiators correspond to the formula $R^2(Li)_x$, in which $R^2$ is a hydrocarbon radical which can be an aliphatic, cycloaliphatic, aromatic, or a combination radical, and x is an integer of 1 to 4. The $R^2$ group has a valence equal to x and preferably contains 1 to 20 carbon atoms, although higher molecular weight compounds are operable.

Examples of suitable lithium-containing compounds include methyllithium, isopropyllithium, n-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithioeicosane, 1,4-dilithiocyclohexane, 1,4-dilithio-2-butene, 1,8-dilithio-3-decene, 1,4-dilithiobenzene, 1,5-dilithioanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane, and 1,2,3,5-tetralithio-4-hexylanthracene.

Other useful initiators include reaction products between the compounds $R^2(Li)_x$ and a divinylaromatic or a trivinylaromatic hydrocarbon compound containing 1 or 2 benzene rings or alkyl substituted benzene rings, the total of the alkyl substituents not exceeding 12 carbon atoms. Examples of suitable di- or tri-vinylaromatic compounds include 1,3-divinylbenzene, 1,3,5-trivinylnaphthalene, and 4,4'-divinylbiphenyl.

The initiator level for the polymerization can vary widely, but generally is in the range of about 1 to 50 gram millimoles per 100 grams of total monomers to be polymerized.

The lactone copolymer in its simplest form can be represented by the formula A-(D)$_y$ where A and D are polymer segments and y is an integer of 1 to 4. When a monolithium initiator is used, the lactone copolymers can be represented at least in part by the formula A-D. In these formulae, A is a polymer segment comprising one or more polymer blocks (including homopolymer, random, and random-tapered blocks) of one or more conjugated dienes or one or more monovinylarenes, or mixtures, and D is a polymer segment comprising one or more polymer blocks of one or more lactones. When the A segment comprises a copolymer of conjugated dienes and monovinylarenes, the conjugated diene to monovinylarene weight ratio can range from about 99:1 to 1:99. It will be recognized that when a mono- or dilithium initiator is employed, segment A will have a linear structure; and when a tri- or tetralithium initiator is employed, A will be branched, and the branches can have attached terminal polymer segments D. Furthermore, segment A will contain the residue of the organolithium initiator employed.

Following the formation of segment A, the lactone or mixture of lactones can either be added directly to the polymerization mixture containing the preformed living polymer A—Li to give a living polymer which may have the structure A—D—Li, or the lactone or mixture of lactones can be added after the living polymer is reacted with a capping agent such as an oxirane, aldehyde, epoxyaldehyde, polyaldehyde, ketone or epoxyketone, as described in U.S. Pat. Nos. 3,585,257 and 3,639,519. When a capping agent is employed, the resulting polymer will contain a residue of the capping agent used.

To prepare the block copolymers having more than two separate polymer segments (a copolymer of the form A-(D)$_y$ where y=2, 3 or 4), those lithium initiators which contain more than one active lithium atom per molecule are used. These initiators provide a central polymer segment of a conjugated diene or a monovinylarene, or mixture of these, having attached to each of the terminal ends of the polymer segment an active Li atom. Initiators such as formed by reacting lithium with methylnaphthalene and isoprene and solubilizing the reaction product with butadiene (LIMI—B), and catalysts such as a lithium-stilbene adduct, are suitable, as well as those multilithio-containing compounds mentioned previously.

It is currently believed that if the capping agent used is a coupling agent for the preformed A—Li polymer, as is the case, for example, for a compound having two or more oxirane groups, a polyaldehyde, or an epoxyketone, or if no capping agent is added before the lactone (which itself can act as a coupling agent) is added directly to the preformed, non-capped living polymer, there may result a living polymer having the formula $(A)_nZ(Li)_n$, where Z is the residue from one or more molecule of the capping-coupling agent (depending on the type of coupling agent employed) or one molecule of the lactone monomer, and n is an integer having a maximum value equal to the number of living polymer segments A which can combine with the chosen capping-coupling agent or the lactone monomer molecule. When Z is derived from the lactone monomer molecule, n will have a maximum value of 2. The living polymer $(A)_nZ(Li)_n$ can initiate the polymerization of lactone monomer to give a branched polymer having up to n polylactone branches, i.e. $(A)_nZ(DLi)_m(Li)_{n-m}$, where D is block polylactone as described previously and m is zero or a positive integers from 1 to and including n. After termination with an active hydrogen-containing terminating agent, such as an acid, an alcohol, or water, the resulting polymer can be represented by the formula $(A)_nZ(D)_m(H)_{n-m}$. It will be understood by one skilled in the art that, while not being shown, D will have a terminal hydrogen atom resulting from the reaction of $(DLi)_m$ with the active hydrogen-containing terminating agent, while the $(H)_{n-m}$ as shown above is connected directly to Z. There is also the possibility that a small amount of lactone homopolymer may be formed during polymerization as a result of base-catalyzed chain scission of A—D or $(A)_nZ(D)_m(H)_{n-m}$. Thus, the polymerized lactone composition may consist of one or more polymers of the structures A—D, $(A)_nZ(D)_m(H)_{n-m}$, and D.

The formula $A$–$(D)_y$ as used herein is intended to encompass copolymers in which some coupling of the type described above has taken place.

In addition, the living polymers A—D—Li and $(A)_nZ(DLi)_m(Li)_{n-m}$ can be terminated with a coupling agent which can react with two or more of the lithium containing polymers to give a branched polymer matrix. These polymers are not easily represented by a single generic formula, and although not falling within the strictest interpretation of $A$–$(D)_y$, these highly branched, coupled lactone copolymers are intended to be included. Non-limiting examples of types of compounds which can serve as coupling agents include the active halogen containing compounds, such as for example phenyltrichlorosilane, tetrachlorosilane, α,α'-dichloropara-xylene, and the like.

The polymerization reaction employs a diluent. Suitable diluents include, for example, paraffins, cycloparaffins, and aromatic hydrocarbons, as described hereinabove, such as those of 4 to 10 carbon atoms per molecule including mixtures.

Various substances are detrimental to the initiator and the living polymer including such as carbon dioxide, oxygen, and water, should be excluded from the diluent, the reactants, the polymerization apparatus, and the polymerization reaction mixture.

The polymerization temperature for preparation of the A segment of the lactone block copolymers usually is in the range of about 0° C. to 200° C., preferably about 40° C. to 125° C. The capping and/or coupling agent, where used, can be added at the polymerization temperature used for the A segment. The D segment (the polylactone segment) usually is polymerized at a temperature of about −20° C. to 100° C., preferably about 0° C. to 70° C. For convenience, the pressure is maintained at a level sufficient to keep the polymerization reaction mixture substantially in the liquid phase. The time for polymerization of the monomers of each block of segment A can be from about 1 minute to 100 hours, and the time for polymerization of the monomers of each block of segment D can be from about 1 minute to 100 hours.

The combination of polymerization time and temperature for segment D should be chosen so that conversion of monomer to polymer is essentially quantitative to avoid the tendency of polylactones to undergo base-catalyzed degradation by random chain scission to yield lactone oligomers or homopolymer. In the lactone polymerization process, a base is present throughout in the form of the organolithium initiator or the living polymer, which may have terminal —$CH_2Li$ or —$CH_2$—O—Li groups. Because degradation reactions compete with the polymerization reaction for available lithium compound, and since polymerization kinetics are favored, degradation does not occur to any large extent until polymerization is complete. If polymerization is terminated before or immediately following quantitative conversion of lactone monomer to polymer, polylactone degradation is minimized.

Polymerization termination is effected by adding such as an active halogen-containing compound, water, an aqueous solution of a mineral acid, or a carboxylic acid, to the polymerization mixture to remove active lithium. The mineral acids and lower carboxylic acids typically are added as dilute aqueous solutions, for example as a 0.1N solution, whereas the higher molecular weight solid carboxylic acids typically are added without dilution to the polylactone block polymer cement. Termination of polylactone polymerization with an alcohol or a phenolic antioxidant in an alcohol can result in the presence of lithium alkoxide or lithium phenoxide or other substances which tend to induce chain scission and thus reduce the amount of polymerized lactone incorporated in the polymer.

Suitable mineral acids include but are not limited to hydrochloric acid, sulfuric acid and phosphoric acid. The carboxylic acids are the aliphatic, alicyclic, aromatic, and heterocyclic di- and higher acids, and substituted derivatives thereof. Preferred carboxylic acids are the monocarboxylic acids having from about 2 to about 20 carbon atoms per molecule, such as acetic acid, benzoic acid, capric acid, lauric acid, and stearic acid.

Preferably, at least one equivalent weight of acid or water is added for each equivalent weight of organolithium initiator used to initiate the polymerization. The terminating agent can be added using any method taught in the art so long as it provides for quick addition of sufficient terminating agent to react with all of the polymer lithium in the polymerization reaction mixture.

Since the point of quantitative conversion of lactone monomer to polymer cannot be determined by observation of the reaction mixture, it is generally judged for a given set of reaction conditions by determination of the percent conversion of all monomers to polymer and analysis of the resulting copolymer to determine the extent of incorpration and retention of the desired amount of lactone in the copolymer for a given lactone reaction time.

Following termination of the lactone polymerization reaction, the copolymer can be isolated by conventional techniques such as coagulation with an excess of a nonsolvent such as isopropyl alcohol, or by steam stripping, followed by drying of the copolymer. Antioxidant can be added to the polymerization mixture after polymerization termination is complete and prior to polymer isolation and drying. Alternatively, the lactone copolymer need not be isolated, but rather the desired amount of the lactone copolymer cement can be added directly to the polymer cement which is to be steam stripped for crumb recovery.

Examples

The Examples describe the employment of lactone copolymers as stripping aids in polymer crumb, particularly rubber crumb, recovery, in accordance with my invention. Particular amounts employed, particular polymers, monomeric components thereof, specific lactone copolymers employed, amounts, and the like, are intended to be illustrative of my invention and not limitative of the reasonable scope thereof.

EXAMPLE I

A low molecular weight conjugated diene/lactone block copolymer suitable for use as a stripping agent-dispersing aid was prepared. The copolymer was a 70/30 butadiene/ε-caprolactone block copolymer and was prepared according to Recipe I:

| RECIPE I | | |
|---|---|---|
| Step 1 | | |
| | 1,3-Butadiene, parts by weight | 70 |
| | Cyclohexane, parts by weight | 780 |
| | Tetrahydrofuran, parts by weight | 0.05 |
| | n-Butyllithium, mhm$^a$ | 3.0 |
| | Polymerization temperature, °C. | 70 |
| | Polymerization time, minutes | 60 |
| Step 2 | | |
| | Propylene oxide, mhm$^a$ | 5 |
| | Reaction temperature, °C. | 70 → 30 |
| | Reaction time, min. | 10 |
| Step 3 | | |
| | ε-Caprolactone, parts by weight | 30 |
| | Polymerization temperature, °C. | 30 |
| | Polymerization time, min. | 10 |
| Step 4 | | |
| | 0.1 M Hydrochloric acid, ml. | 10 |

$^a$mhm = Gram millimoles per 100 grams of total monomers.

Cyclohexane was charged to a 26-oz. beverage bottle equipped with a perforated crown cap over a self-sealing rubber gasket, and the bottle and cyclohexane then purged with nitrogen. 1,3-Butadiene and tetrahydrofuran were added and then the n-butyllithium. The temperature was adjusted to 70° C. and the bottle and its contents tumbled in a constant temperature bath for one hour, after which time the 1,3-butadiene polymerization was essentially complete. Propylene oxide was then added to the polymerization reaction mixture and the mixture agitated for 10 minutes while reducing the temperature from 70° C. to 30° C. ε-Caprolactone was added and polymerization conducted at 30° C. for 10 minutes with continued agitation. Promptly 10 minutes after the ε-caprolactone had been charged, the polymerization reaction was terminated by adding 10 ml. of 0.1 M hydrochloric acid and thoroughly mixing the reaction mixture by hand-shaking the beverage bottle. One part by weight of 2,6-di-t-butyl-4-methylphenol per hundred parts by weight of total monomers was added as a 10 weight percent solution in 50:50 toluene:isopropanol and the contents of the bottle then emptied into a beaker of water and the butadiene-ε-caprolactone block copolymer isolated by steam stripping. The recovered polymer was dried at 60° C. for about 15 hrs. under reduced pressure. The calculated molecular weight of this polymer based on the relative amounts of initiator and monomers used was about 33,000.

The low molecular weight butadiene-ε-caprolactone block copolymer prepared as described above was employed as a dispersing agent-stripping aid.

To a polymer cement comprising (1) 100 parts by weight of a 52/48 butadiene/styrene radial teleblock copolymer having $M_w/M_n$ of about 247,000/200,000, (2) 60 parts by weight Flexon 766 naphthenic extender oil, and (3) 600 parts by weight cyclohexane, was added one part by weight of the low molecular weight butadiene-ε-caprolactone block copolymer. The butadiene-ε-caprolactone copolymer was added as a dry powder to the polymer cement which was at ambient room temperature. This polymer cement with added butadiene-ε-caprolactone block copolymer then was subjected to steam stripping at a stripping temperature of 205° F. (96° C.). The resulting polymer crumb was of good quality and was equivalent to that of a control which was steam stripped in a stripper bath which contained as the dispersing agent-stripping aid about 0.05–0.10 parts by weight of the sodium salt of a maleic anhydride/isobutylene copolymer in admixture with about 0.05–0.10 parts by weight calcium chloride per 100 parts of total butadiene/styrene copolymer.

An attempt to strip the described polymer cement in the absence of a dispersing agent-stripping aid resulted in the formation of large, sticky polymer agglomerates.

EXAMPLE II

This run illustrates the preparation of a low molecular weight 20/80 butadiene/ε-caprolactone block copolymer suitable for use as a stripping agent-dispersing aid. The butadiene/ε-caprolactone block copolymer was prepared according to Recipe II.

| RECIPE II | | |
|---|---|---|
| Step I | | |
| | 1,3-Butadiene, parts by weight | 20 |
| | Cyclohexane, parts by weight | 800 |
| | Tetrahydrofuran, parts by weight | 0.10 |
| | n-Butyllithium, mhm$^a$ | 3.8 |
| | Polymerization temperature, °C. | 50 → 58$^b$ |
| | Polymerization time, minutes | 30 |
| Step II | | |
| | ε-Caprolactone, parts by weight | 0.5 |
| | Polymerization temperature, °C. | 58 |
| | Polymerizaton time, minutes | 5 |
| Step III | | |
| | ε-Caprolactone, parts by weight | 79.5 |
| | Polymerization temperature, °C. | 30 |
| | Polymerization time, minutes | 30 |
| Step IV | | |
| | Methanol$^c$, parts by weight | 0.1 |

$^a$mhm = Gram millimoles per 100 grams of total monomers.
$^b$Polymerization initiated at 50° C. and polymerization temperature peaked at 58°.
$^c$Added as a 2 weight percent solution in cyclohexane.

Steps I and II were carried out in a first 20 gal. capacity, jacketed, stirred reactor and the reaction mixture transferred to a second 20 gal. capacity, jacketed, stirred reactor for Steps III and IV. Following termination with methanol in Step IV, 0.5 parts by weight of 2,6-di-t-butyl-4-methylphenol was added as a 20 weight percent solution in cyclohexane, and the butadiene/ε-caprolactone block copolymer then isolated by steam stripping. The calculated molecular weight of this copolymer based on the relative amounts of initiator and monomers used in the polymerization was about 26,000.

The low molecular weight 20/80 butadiene/ε-caprolactone block copolymer prepared as described above was employed as a dispersing agent-stripping aid according to the procedure and using the polymer cement as described in Example I. The polymer crumb which was obtained was slightly larger than that obtained in Example I. It is believed that this was due to the relatively low solubility of this 20/80 butadiene/ε-caprolactone copolymer in cyclohexane, probably attributable to the high ratio of the polar poly(ε-caprolactone) in this copolymer.

EXAMPLE III

This run illustrates the use of a low molecular weight 70/30 butadiene/ε-caprolactone copolymer similar to that described in Example I as a dispersing agent-stripping aid for an 85/15 butadiene/styrene block copolymer having a terminated carboxyl group attached to the polybutadiene block. This carboxyl terminated polymer was prepared according to Recipe III.

| RECIPE III | | |
|---|---|---|
| Step I | | |
| | Styrene, parts by weight | 15 |
| | Cyclohexane, parts by weight | 600 |
| | Tetrahydrofuran, parts by weight | 0.05 |
| | n-Butyllithium, mhm$^a$ | 1.6 |
| | Polymerizaton temperature, °C. | 50 → 55$^b$ |
| | Polymerization time, minutes | 45 |
| Step II | | |
| | 1,3-Butadiene, parts by weight | 85 |
| | Polymerization temperature, °C. | 55 → 115$^c$ |
| | Polymerization time, minutes | 60 |
| Step III | | |
| | Cool | 115 → 30$^d$ |
| | Carbon dioxide, mhm$^a$ | >1.6 (excess) |
| | Reaction temperature, °C. | 30 |
| | Reaction time, minutes | 15 |
| Step IV | | |
| | Stearic acid$^e$, mhm$^a$ | 1.8 |
| | Reaction temperature, °C. | 30 |
| | Reaction time | 10 |

$^a$mhm = Gram millimoles per 100 grams of total monomers.
$^b$Polymerization initiated at 50° C. and polymerization temperature peaked at 55° C.
$^c$Polymerization initiated at 55° C. and polymerization temperature peaked at 115° C.
$^d$Cooled from 115° C. to 30° C. before charging carbon dioxide.
$^e$Added as a solution in cyclohexane.

Following termination with stearic acid in Step IV, 0.4 parts by weight of 2,6-di-t-butyl-4-methylphenol was added as a cyclohexane solution. To the polymer cement was then added 1.3 parts by weight of the 70/30 butadiene/ε-caprolactone copolymer per 100 parts of the carboxyl terminated 85/15 butadiene/styrene copolymer, and the polymer recovered by steam stripping at a stripper temperature of 100° C. The polymer stripped well giving good crumb.

The disclosure, including data, illustrate the value and effectiveness of my invention. The Examples, the knowledge and background of the field of the invention, as well as the general principles of chemistry and other applicable sciences, have formed the bases to which the broad description of the invention including the range of conditions and generic groups of operate components have been developed, and further formed bases for my claims here appended.

I claim:

1. In a steam-stripping process for recovering a polymer prepared by polymerizing an olefinically unsaturated monomer in a hydrocarbon solvent with an organometal initiator wherein the resulting polymer-in-hydrocarbon solvent solution is steam-stripped to remove said hydrocarbon solvent and to produce polymer crumb in aqueous phase after shortstopping the process of polymerizing.

the improvement which comprises employing during said steam-stripping an effective steam-stripping amount of a low molecular weight lactone copolymer as stripping aid, wherein said lactone copolymer is a copolymer of a lactone with a conjugated diene and/or a monovinylarene, and has a molecular weight of about 2000 to 100000.

2. The process according to claim 1 wherein said effective stripping amount of said lactone copolymer is at least about 0.1 part by weight per 100 grams of rubber contained in said rubber-in-solvent solution.

3. The process according to claim 2 employing about 0.2 to 1 part by weight of said lactone copolymer.

4. The process according to claim 3 wherein said lactone copolymer is added to said polymer-in-solvent solution in the form of a solution in a hydrocarbon solvent containing about 2 to 70 percent by weight lactone copolymer, the balance hydrocarbon solvent.

5. The process according to claim 4 wherein said lactone copolymer is a copolymer of at least one

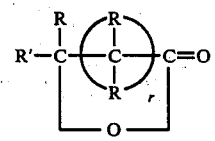

wherein each R is independently selected from hydrogen, or hydrocarbyl radical, R' is selected from the group consisting of R, hydrogen, and

such that the total number of carbon atoms in all substituents is in the range of 0 to 12, and r is 1, 3, or 4,
with at least one conjugated diene and/or a monovinylarene, and
wherein said copolymer contains about 10 to 60 weight percent polymerized lactone, and said copolymer molecular weight is about 10000 to 50000.

6. The process according to claim 5 wherein said polymer-in-solvent solution is a rubber solution produced by the solution polymerization of at least one conjugated diene, optionally with at least one monovinylarene, under solution polymerization conditions employing an alkali metal-based initiator, wherein said rubber-in-solvent solution represents a concentration of about 1 to 25 weight percent rubber.

7. The process according to claim 6 wherein said stripping operation is conducted at a temperature in the range of about 200° to 220° F.

8. The process according to claim 7 wherein said lactone copolymer is a butadiene/caprolactone copolymer containing a copolymerized ratio of about 70:30 butadiene:caprolactone.

* * * * *